Sept. 25, 1923.  
F. S. WALLACE  
1,469,200  
METHOD OF AND MEANS FOR HANDLING AND HACKING BRICKS  
Filed April 27, 1920  3 Sheets-Sheet 1
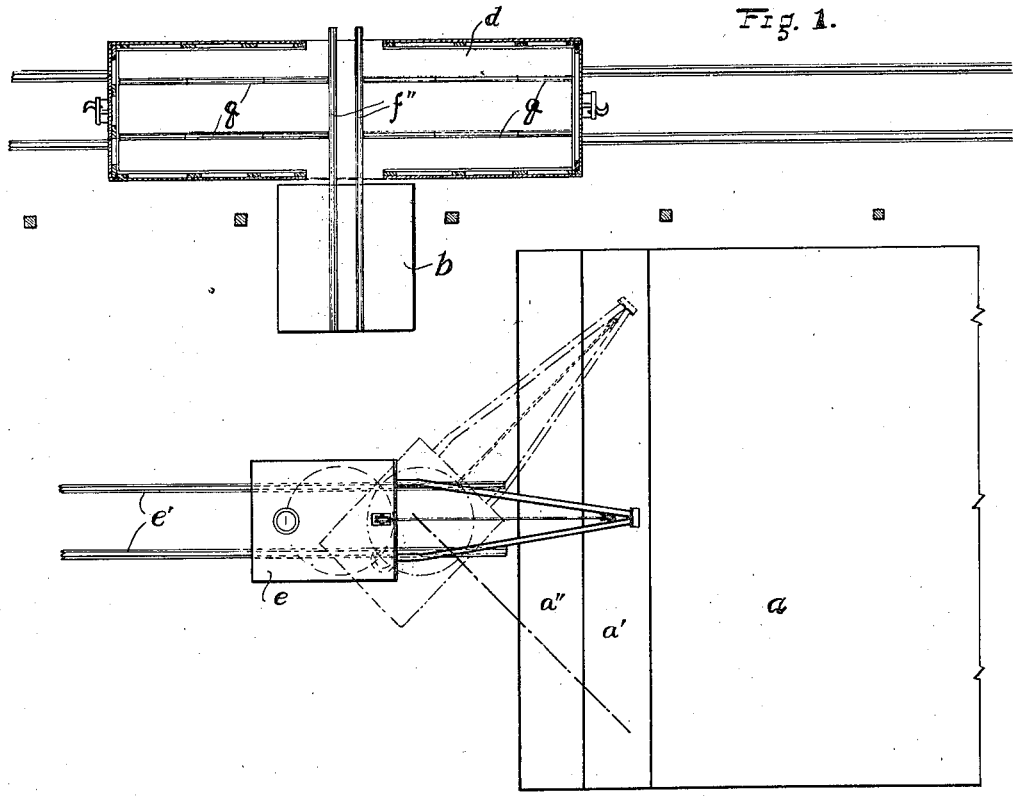
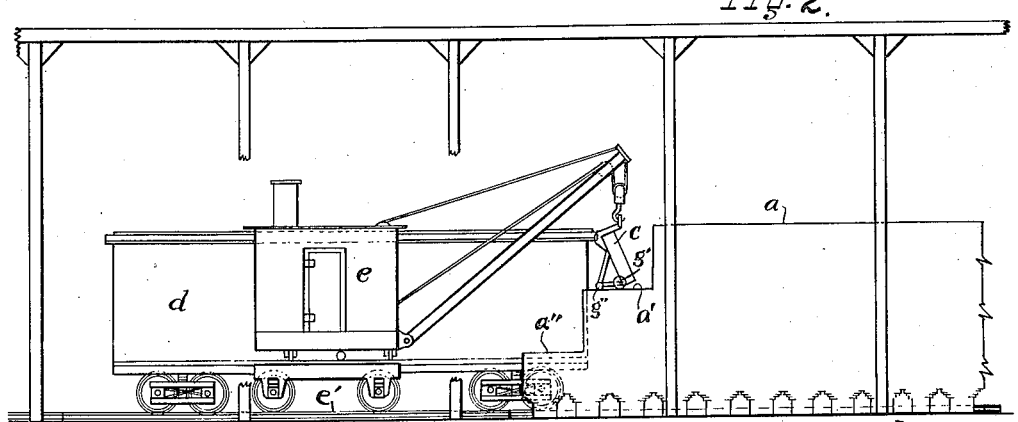
Inventor  
FRED S. WALLACE,
By _____,  
Attorney.

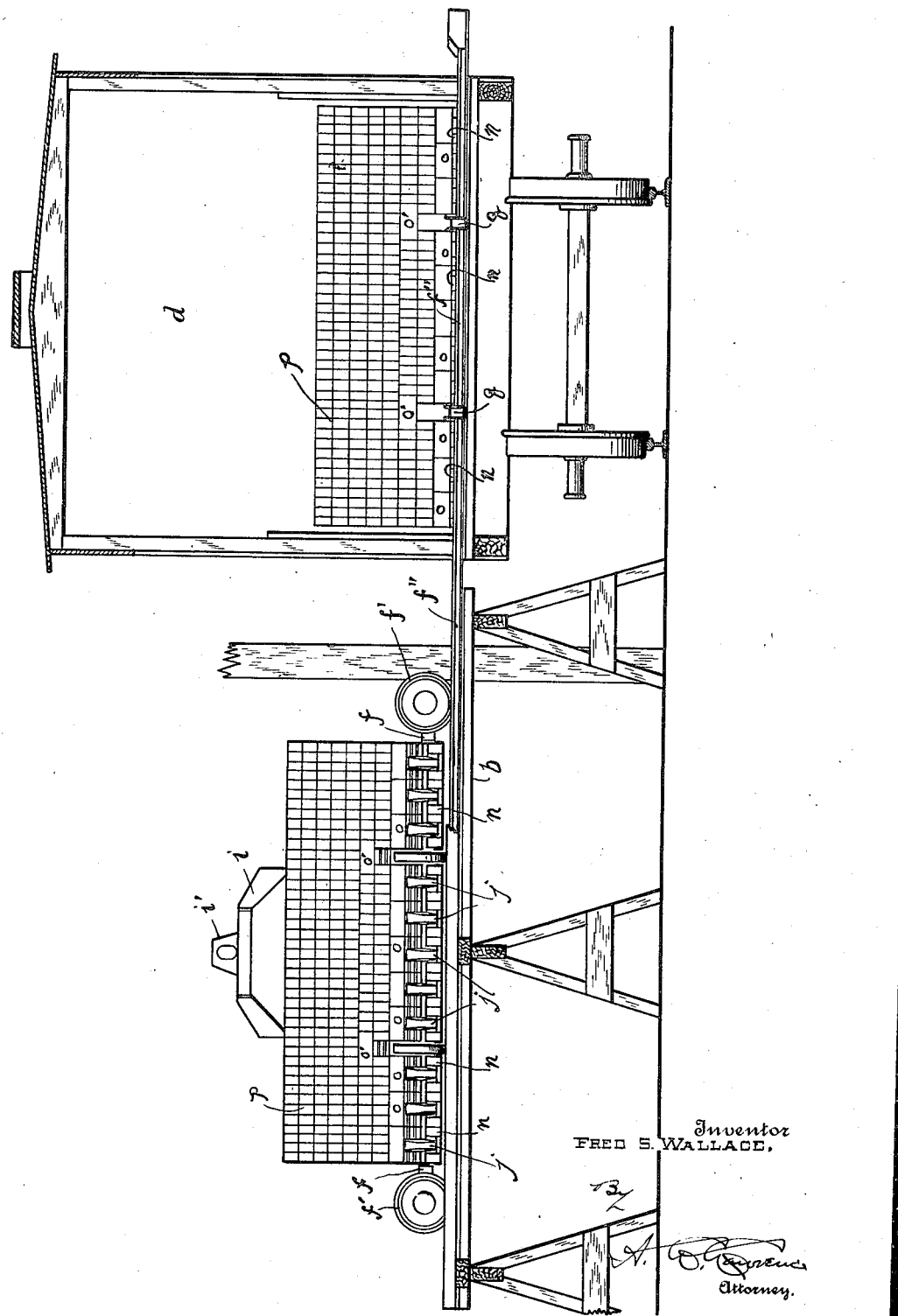

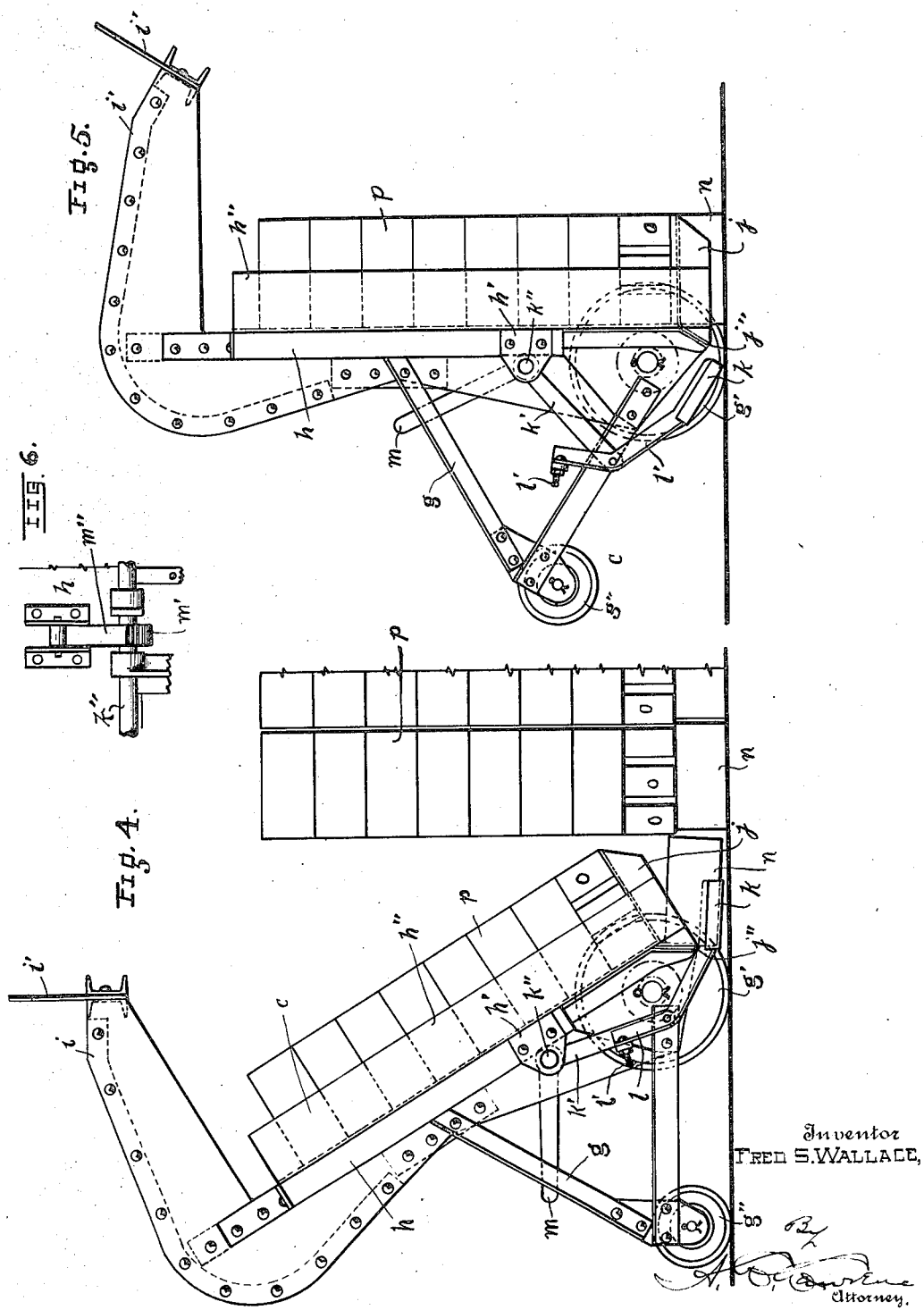

Patented Sept. 25, 1923.

1,469,200

UNITED STATES PATENT OFFICE.

FRED S. WALLACE, OF CLEVELAND, OHIO.

METHOD OF AND MEANS FOR HANDLING AND HACKING BRICKS.

Application filed April 27, 1920. Serial No. 377,099.

*To all whom it may concern:*

Be it known that I, FRED S. WALLACE, a citizen of the United States, residing at Cleveland, in the county of Cuyahoga and State of Ohio, have invented certain new and useful Improvements in Method of and Means for Handling and Hacking Bricks, of which the following is a specification.

My invention relates to improvements in method of and means for handling and hacking bricks, and has for its object the economical and rapid handling of bricks and like materials directly from the kiln or place of origin to the carrier in relatively large numbers, with but one manual handling thereof. More specifically, my invention contemplates the piling of the bricks from the kiln into or upon a suitable wheeled conveyor adapted to repile said bricks, transporting the loaded conveyor to the carrier, as a car or barge, for example, and unloading the bricks, as a whole, in position upon the carrier. Preferably said carrier is the full width, or substantially so, of the repiled bricks, or a unit thereof. Consequently, the conveyor is substantially such width or a unit thereof, and preferably this conveyor is provided with means for separately supporting a spaced bottom row of bricks and additional means for supporting a bridging row thereof, in association with means for withdrawing the support from the bottom row when the conveyor is in dumping position.

My invention further contemplates a novel mode of assembling the bricks, whereby the conveyor may readily be removed without disturbing the tier of bricks when transported to place upon the carrier.

My invention contemplates, in addition, certain structural features of a wheeled dumping truck or conveyor adapted to the needs of my improved method. These several features of improvement will be explained in detail, in connection with the accompanying drawings:

Figure 1 of said drawings is a diagrammatic plan view of the organization for practicing my invention and Fig. 2 a side elevation of a portion thereof, whereby my improved method may be explained.

Fig. 3 is an enlarged view, partly in vertical section, showing the loading platform, conveyor and carrier in somewhat conventional form; the latter being illustrated as a freight car.

Fig. 4 is a view in side elevation upon still larger scale to show the wheeled conveyor of my invention in position before dumping against the pile of bricks.

Fig. 5 is a similar view of the conveyor with the bottom support withdrawn and the tier of bricks positioned in place for transportation, and Fig. 6 is a fragmentary view of the detaining ratchet wheel for the bottom support.

Throughout the several figures of the drawings I have employed the same character of reference to indicate similar parts.

Turning to the assembled organization shown in Figs. 1 and 2, the brick kiln $a$ is illustrated in the lower or right hand portions of said figures; preferably being stepped off in the loading operation at at $a'$ and $a''$, to afford different and convenient levels for filling the conveyor $c$ of Figs. 4 and 5. The loading platform $b$ is positioned before the carrier or car $d$ adjacent to that portion of the kiln which is being handled or operated upon.

A locomotive crane $e$ is advanced along its tracks $e'$ as the kiln is loaded from, in convenient position to handle the conveyors by swinging them from either level $a'$, $a''$ or from the ground, as required, to the loading platform $b$. This platform is equipped with a low wheeled truck, as best shown in Fig. 3, comprising a depressed bed $f$ and flanged wheels $f'$ whereon the conveyor may be lowered by the crane and transported upon the extended rails $f''$ into the carrier or car $d$.

A description of the conveyor $c$ should be kept in mind in order to understand the mode of hacking the bricks. This comprises a frame $g$ having front and rear supporting wheels $g'$, $g''$, whereon the inclined bed $h$ is carried substantially at 45° in slightly overbalanced position to be sustained by the braced rear wheels $g''$. Above the bed $h$ there is provided a right angularly extending frame $i$, having a yoke $i'$ adapted to be engaged by the hook of the crane for transporting the conveyor.

Disposed at intervals across the bed $h$ are brackets $j$ which are adapted to afford support for the lower row of bricks carried by the inclined bed. Beneath said brackets there is positioned a removable support $k$ for the bottom row of hacked bricks; these being carried substantially in a horizontal row at the base of the inclined bed and generally beneath its supported tier of bricks. Said support $k$ is mounted upon the pivoted arms $k'$ from the actuating shaft $k''$ mounted in the side brackets or journals $h'$ laterally of the bed $h$. The sides $h''$ are provided at each end for maintaining the tier of bricks in position upon the bed during the movement of the conveyor. The bed and frame may readily be fabricated from sheet steel and structural iron, as will be seen.

The further means for actuating the bottom support $k$ for the horizontal row of bricks, comprise the angle members $l$ which are laterally pivoted to the arms $k'$ and are provided with set screws $l'$ adapted to regulate the position and height of the support $k$ mounted at the opposite ends of the members $l$. A lever $m$ is secured to the shaft $k''$ for actuating the removable support $k$ and a ratchet wheel $m'$ upon said shaft is provided with a detent $m''$ for normally holding the support in its extended position to carry the bottom row of bricks.

Referring in turn to the front view of the loaded conveyor, as depicted in Fig. 3, it is seen that a spaced bottom row of bricks is initially placed upon the support $k$ intermediately of the brackets $j$ and of the front wheels $g'$. These bricks are disposed endwise in substantially horizontal position, and are indicated by $n$ in said figure. Upon the brackets $j$ there are then positioned preferably three rows of bricks arranged on edge, as shown at $o$ in Figs. 4 and 5. It will be seen that each row of bricks bridges the spaced bottom row $n$, but is elevated above the same in the normal position of the truck. Piled upon these bridging rows of bricks, which preferably are slightly spaced apart laterally to afford full support, are the bulk of the bricks $p$, row on row and side by side, in closely engaging relation; two displaced bridging rows of bricks $o'$ being disposed above the front wheels. These bricks are thus hacked substantially the full width of the car $d$ at the kiln and, accordingly, are adapted to be transported as a whole to loading position in the carrier.

As stated, the locomotive crane first is employed to swing the conveyor as thus manually loaded, into position upon the supporting bed of the truck of the loading platform. This truck is then pushed along the rails $f''$ into the car; the conveyor traveling edgewise until its wheels are in register with the sectional grooved rails $q$ which have been disposed upon the bottom of the car. The conveyor is readily pushed along these sectional rails to the loading end of the car, i. e., toward the observer of Fig. 3; it being assumed that the opposite end of said car has been loaded.

Referring to Fig. 4, it will be observed that the bottom row of bricks $n$ comes into engagement with the preceding row $o$ of hacked bricks to afford a radial movement for the superposed tier of bricks when the truck is dumped. The lever $m$ is now actuated after releasing the detent $m''$ and the support $k$ is withdrawn from the bottom row of bricks so that they will be forced to slide into position by the extension $j''$, after which the truck is dumped from its slightly counterbalanced position to that shown in Fig. 5.

This operation serves to hack the tier of bricks without chipping or breaking the adjacent tier, and without manual handling, quite closely adjacent to the bricks previously piled in the car and substantially its full width, as shown in Fig. 4.

The lever is shown in Fig. 5, together with the actuating means for the bottom support, in their fully withdrawn position, while the dotted lines correctly indicate that the brackets $j$ have been tilted below the level of the bottom row of bricks $n$, so that the truck may readily be withdrawn along the sectional rails, taken to the loading platform on the depressed bed $f$ and from thence swung back to position upon the kiln for reloading. In practice, of course, a number of these trucks or conveyors $c$ are concurrently used, so that these may be in process of manual loading and of unloading as above described.

While the wheeled conveyor or its equivalent is quite necessary to the practice of my improved method. I do not wish to be understood as restricting said method to the precise details set forth, nor to the means, including the locomotive crane and loading platform, for transferring the conveyor to and from the carrier, since any appropriate means may be substituted therefor.

Preferably the conveyor is moved towards and from its dumping position within or upon the carrier, with its wheels supported by suitable rails, as the grooved rails or sectional channel members $q$ of Figs. 1 and 3. If these are employed, the short sections may be extended to either end of the carrier and then removed, section by section, as said carrier is loaded, inasmuch as the sections will be positioned beneath the bridging rows of bricks $o'$ and consequently are free to be removed from beneath the hacked bricks. Of course, the center of the car, approximating the space between the rails $f''$, may not be loaded from the conveyor with any marked convenience. This space, however, is desirable for manually unloading the bricks, even if more space is not actually provided by the capacity-loading of the car to the full weight permitted.

It will be appreciated that the method herein set forth admits of rapid loading with but one manual handling of bricks and similar materials, directly from the kiln or other loading position, to the desired carrier, thereby saving materially in the cost of labor and the time involved.

Having now described the preferred method and means for practicing my invention, I claim as new and desire to secure by Letters Patent, together with such departures therefrom or modifications as may be made by mere skill in practicing the same, the following:

1. The method of hacking bricks, which consists in assembling in a conveyor at the kiln a complete vertical tier of such bricks the full width of the cooperating carrier, moving the conveyor and contained bricks to said carrier, and placing said tier of bricks as a whole upon the carrier, substantially as set forth.

2. A method of hacking bricks, which consists in assembling in a wheeled conveyor a complete vertical tier of such bricks the full width of the transportation space upon the cooperating carrier, moving the conveyor and supported bricks to said carrier, and piling the tier of bricks as a whole in position upon the carrier, substantially as set forth.

3. A method of hacking bricks, which consists in assembling in a wheeled conveyor a complete vertical tier of such bricks, including a spaced bottom row thereof, moving the conveyor and supported bricks to place upon a carrier, and dumping the conveyor to position the vertical tier upon its spaced bottom row and permit the removal of said conveyor, substantially as set forth.

4. A method of assembling bricks for handling and transportation, which consists in positioning upon a conveyor a bottom row of bricks in edgwise spaced relation, positioning an adjacent horizontally spaced row in transverse relation to bridge the spaces between the bricks of the bottom row, and positioning thereon a plurality of rows of bricks substantially in contact as a whole, as herein set forth.

5. A conveyor for hacking bricks, comprising a wheeled truck, a support for a separate bottom row of bricks, means for withdrawing said support, and a plurality of stationary arms adapted to sustain a vertical tier of bricks, substantially as set forth.

6. A conveyor for hacking bricks, comprising a wheeled truck, a lower support for a bottom row of bricks, means for withdrawing said support, an inclined support in substantially balanced position over the wheels, and a plurality of stationary arms associated therewith along its lower edge adapted to carry a bridging row of bricks together with the superposed tier of bricks thereon, substantially as set forth.

7. A conveyor for hacking bricks, comprising a wheeled truck, a support for a bottom row of bricks, means for withdrawing the same, and a plurality of supporting arms positioned to be tilted below the level of said bottom row of bricks, whereby the conveyor may be freed from its load, substantially as set forth.

8. A conveyor for hacking bricks, consisting of a wheeled truck, an inclined load-supporting frame approximately in balanced position above the wheeled base of said truck, a subjacent support for a bottom row of bricks, and means for independently withdrawing said support, whereby said bottom row may be placed in desired position, substantially as set forth.

9. A conveyor for hacking bricks, comprising a truck, a wide wheel base therefor, an inclined load-supporting frame approximately in balanced position thereon, a plurality of load-supporting arms extending from the lower portion of the frame, a subjacent support for a bottom row of bricks, and means for withdrawing the same; said arms being disposed in position to be lowered below the level of the bottom row of bricks when the truck is tilted to its overbalanced unloading position, substantially as set forth.

10. A conveyor for hacking bricks, comprising a wheeled truck, a load supporting frame in balanced position substantially above the wheels of the truck, a subjacent under-support for a bottom row of bricks, and means for withdrawing said under-support independently for placing the row in position, substantially as set forth.

11. A conveyor for hacking bricks, comprising a wheeled truck, an upper frame approximately in balanced position above the wheels of the truck, supporting members below said frame, an independent, subjacent under-support, and means for separately retracting the latter support, substantially as set forth.

12. A method of hacking bricks, which consists in assembling in a wheeled conveyor a complete tier of such bricks approximating the full width of the transporting space upon a cooperating carrier, together with a subjacent row of independently supported bricks, moving the conveyor and load to position upon the carrier, placing the subjacent row of bricks thereon, and piling the tier of bricks as a whole upon said row, substantially as set forth.

13. A method of hacking bricks in a closed carrier, which consists in assembling in a wheeled conveyor a complete vertical tier of such bricks the full width of the transportation space upon the closed carrier, moving the conveyor centrally within the carrier and longitudinally thereof to a loading position, and piling the tier of bricks as a whole transversely within the carrier, substantially as set forth.

14. A method of hacking bricks in a box car, which consists in assembling upon a wheeled conveyor a complete vertical tier of such bricks and an independently supported bottom row thereof, moving the conveyor centrally within the box car and longitudinally thereof to a loading position, and successively depositing the bottom row of bricks and the vertical tier thereof in position for transportation within the car, substantially as set forth.

15. A method of hacking bricks for economical handling and transportation, which consists in placing temporary tracks upon a carrier, assembling upon a wheeled conveyor a complete vertical tier of bricks substantially the full width of the transportation space upon the carrier with a bottom row of bricks spaced apart to accommodate the tracks, placing the conveyor upon said tracks, moving it along the tracks to the loading position upon the carrier, and piling the tier of bricks as a whole to clear the tracks, substantially as set forth.

In testimony whereof I hereto affix my seal and signature in the presence of two witnesses.

FRED S. WALLACE. [L. S.]

Witnesses:
C. A. KOLWING,
CARL H. SCHUSTER.